United States Patent
Puente et al.

(10) Patent No.: US 10,267,480 B2
(45) Date of Patent: Apr. 23, 2019

(54) LIGHTING ASSEMBLY FOR LIGHTING AND/OR SIGNALING IN A MOTOR VEHICLE

(71) Applicant: Valeo Vision, Bobigny (FR)

(72) Inventors: Jean-Claude Puente, Livry Gargan (FR); Marc Brassier, Le Perreux sur Marne (FR)

(73) Assignee: Valeo Vision, Bobigny (FR)

( * ) Notice: Subject to any disclaimer, the term of this patent is extended or adjusted under 35 U.S.C. 154(b) by 122 days.

(21) Appl. No.: 15/428,540

(22) Filed: Feb. 9, 2017

(65) Prior Publication Data

US 2017/0241612 A1    Aug. 24, 2017

(30) Foreign Application Priority Data

Feb. 18, 2016    (FR) ...................... 16 51305

(51) Int. Cl.
*B29C 45/00*    (2006.01)
*F21S 43/20*    (2018.01)
(Continued)

(52) U.S. Cl.
CPC .......... *F21S 43/26* (2018.01); *B29C 45/0001* (2013.01); *B29C 45/1671* (2013.01); *F21S 41/50* (2018.01); *F21S 43/31* (2018.01); *F21S 45/10* (2018.01); *B29C 45/14336* (2013.01); *B29K 2995/0012* (2013.01); *B29K 2995/0026* (2013.01); *B29L 2031/30* (2013.01); *B29L 2031/747* (2013.01)

(58) Field of Classification Search
CPC .. F21S 43/26; F21S 45/10; F21S 43/31; F21S 41/50
See application file for complete search history.

(56) References Cited

U.S. PATENT DOCUMENTS 5,571,277 A * 11/1996 Allred .................... B60Q 1/302
                                                        340/479
5,931,566 A *  8/1999 Fraizer ................... F21S 43/26
                                                        362/293
(Continued)

FOREIGN PATENT DOCUMENTS

DE    202012005548 U1    8/2012
EP         2672170 A3 * 12/2014    .............. F21S 41/50
(Continued)

OTHER PUBLICATIONS

Translation of EP 2 672 170 A3.*

*Primary Examiner* — Jong-Suk (James) Lee
*Assistant Examiner* — Christopher E Dunay
(74) *Attorney, Agent, or Firm* — Oblon, McClelland, Maier & Neustadt, L.L.P.

(57) ABSTRACT

A lighting assembly for lighting and/or signaling in a motor vehicle that palliates the disadvantages resulting from the reflection and focusing of solar rays by focusing means of a lighting module for lighting and/or signaling in a motor vehicle onto a mask disposed under a lighting module. The lighting assembly comprises means for emitting and means for focusing one or more light beams, together with a mask, a part of which extends under the focusing means. A part of the mask is transparent to light, so that solar rays reflected and focused by the focusing means onto the mask pass through the transparent part.

15 Claims, 2 Drawing Sheets

(51) Int. Cl.
*F21S 45/10* (2018.01)
*F21S 41/50* (2018.01)
*F21S 43/31* (2018.01)
*B29C 45/16* (2006.01)
*B29C 45/14* (2006.01)
*B29L 31/30* (2006.01)
*B29L 31/00* (2006.01)

(56) References Cited

U.S. PATENT DOCUMENTS

| | | | | |
|---|---|---|---|---|
| 2004/0170847 A1* | 9/2004 | Lefevre | ............... | B60Q 1/0041 428/458 |
| 2004/0217856 A1* | 11/2004 | Egashira | ............... | F21S 43/00 340/468 |
| 2009/0257241 A1* | 10/2009 | Meinke | ............... | B60Q 1/2669 362/546 |
| 2014/0286030 A1* | 9/2014 | Hohmann | ............... | F21S 43/00 362/511 |
| 2015/0210226 A1* | 7/2015 | Topart | ............... | B60R 13/02 362/511 |
| 2015/0279523 A1* | 10/2015 | Oeuvrard | ............... | H01C 10/12 338/47 |
| 2015/0321456 A1* | 11/2015 | Gasworth | ............... | C08K 3/01 428/81 |
| 2017/0166111 A1* | 6/2017 | Baccarin | ............... | F21S 43/13 |
| 2018/0022274 A1* | 1/2018 | Kincade | ............... | B60Q 1/56 362/23.09 |

FOREIGN PATENT DOCUMENTS

| | | |
|---|---|---|
| FR | 2896852 A1 | 8/2007 |
| FR | 3022330 A1 | 12/2015 |
| JP | 2009199778 A | 9/2009 |
| JP | 2014149980 A | 8/2016 |

* cited by examiner

LIGHTING ASSEMBLY FOR LIGHTING AND/OR SIGNALING IN A MOTOR VEHICLE

CROSS-REFERENCE TO RELATED APPLICATIONS

This application claims priority to the French application 1651305 filed Feb. 18, 2016, which application is incorporated herein by reference and made a part hereof.

BACKGROUND OF THE INVENTION

1. Field of the Invention

The present invention relates to lighting assemblies for lighting and/or signaling in motor vehicles.

2. Description of the Related Art

Lighting assemblies for lighting and/or signaling in a motor vehicle may comprise a lighting module accommodating an optical assembly for generating and focusing one or more light beams and a mask that surrounds the lighting module.

In known manner, the optical assembly includes one or more light-emitting sources (incandescent lamps or gas discharge lamps or light-emitting diodes) and optical means designed to form, to focus and to guide one or more light beams, depending on the number of emitting sources employed. These optical means generally include means for optical deflection of the rays emitted by the sources in the direction of focusing means disposed at the outlet of the optical assembly, for example one or more lenses.

The mask is generally a component of complex geometry a part of which extends under the focusing means. Its main function is the protection or the concealment of certain elements such as, by way of nonexhaustive example, components for fixing the light-emitting sources or integrated sensors to the lighting and/or signaling lighting assembly. The mask also has an aesthetic function, contributing to the general appearance of the optics as seen from the outside of the vehicle. In this regard, its manufacture and its durability must be compatible with the aesthetic constraints of the vehicle. Notably, depending on the level of the vehicle within the range, the masks may have a black or metalized appearance and are expected to retain this appearance over time, without deformation.

Under particular sunshine conditions and in a particular vehicle position, it can happen that solar rays are deflected by the lens and focused inside the optical assembly on the part of the mask that extends under the aforementioned focusing means. This phenomenon, known as "sunburn", generates very high levels of local heating, which local heating leads to sometimes severe damage to the mask or components situated in its vicinity.

The phenomenon is all the more marked and can be all the greater if the mask is made from black or dark colored materials, which absorb heat with the result that focusing the rays at a precise point can lead to overheating and irreversible deformation of the mask.

The document FR2896852 proposes the installation of a set of means for detecting the focusing of solar rays, for example one or more heat sensors, optical sensors or electrical sensors. According to the solution proposed by the document FR2896852, the signals supplied by the detection means actuate protection means such as removable covers.

However, a solution of this kind necessitates the installation of relatively complex and costly control and feedback electronic means. It also increases the overall size of the lighting and/or signaling assembly.

What is needed, therefore is an improved, lighting and/or signaling device that overcomes one or more of the aforementioned problems.

SUMMARY OF THE INVENTION

An object of the invention is to propose a simple solution of relatively low cost to palliate the disadvantages resulting from reflection and focusing of solar rays onto the mask portion disposed under the module by focusing means of a lighting module for lighting and/or signaling in a motor vehicle.

To this end, the invention proposes a lighting assembly for lighting and/or signaling in a motor vehicle, which includes a lighting module accommodating means for emitting and means for focusing one or more light beams and also includes a mask a portion of which extends under the focusing means. According to the invention, the portion of the mask includes a part transparent to light so that solar rays reflected and focused by the focusing means on the mask portion pass through the transparent part.

The transparent part is advantageously of small size so that it is not visible to the naked eye of an observer facing the lighting and/or signaling assembly.

Clearly, according to the invention, the aim is to render part of the mask transparent over only the area of impact of the solar rays that impinge on the mask after reflection and focusing by the lens. This phenomenon occurs only under particular conditions, with the result that it is possible to determine the area of impact of these rays for each lighting assembly design. It is then possible to propose a transparent part of small size that is effective for the transmission of rays and represents a relative modest penalty in regard to the aesthetics of the assembly. In particular, the transparent part may advantageously be inclined relative to the normal to the plane of the mask so that it is oriented in the direction of the focusing means.

According to various features of the invention, separately or in combination:

- the mask portion includes a first face opposite a second face exposed to the light rays, the part being transparent from the first face to the second face;
- the mask is made from a transparent or translucent base material combined with an additive making it possible to render the mask darker than in its original composition with no additive: the base material may be a highly transparent polymer, notably from the family of polycarbonates or the family of polyethersulfones;
- the additive may consist of a thin metal coating carried by a first face of the mask opposite the face of the mask exposed to said light rays, and the coating then includes apertures to expose the transparent part;
- the additive may be included within the thickness of the mask, the additive being injected into the base material: in this case the part transparent to said light rays may be the result of an opening provided in the mask;
- the coating includes apertures produced by laser ablation to form this opening;
- the mask is produced by injection molding two polymer materials with different thermal properties, one of which forms the part transparent to the solar rays and reflected and focused onto the mask by the focusing means and the other of which constitutes the rest of the mask;

the transparent part has a circular arc shape following the curvature of a lens forming the focusing means.

These and other objects and advantages of the invention will be apparent from the following description, the accompanying drawings and the appended claims.

BRIEF DESCRIPTION OF THE ACCOMPANYING DRAWINGS

Other features and advantage of the invention will emerge from the following description of a preferred embodiment thereof, as well as from the following figures.

DETAILED DESCRIPTION OF THE PREFERRED EMBODIMENTS

Figure 1:
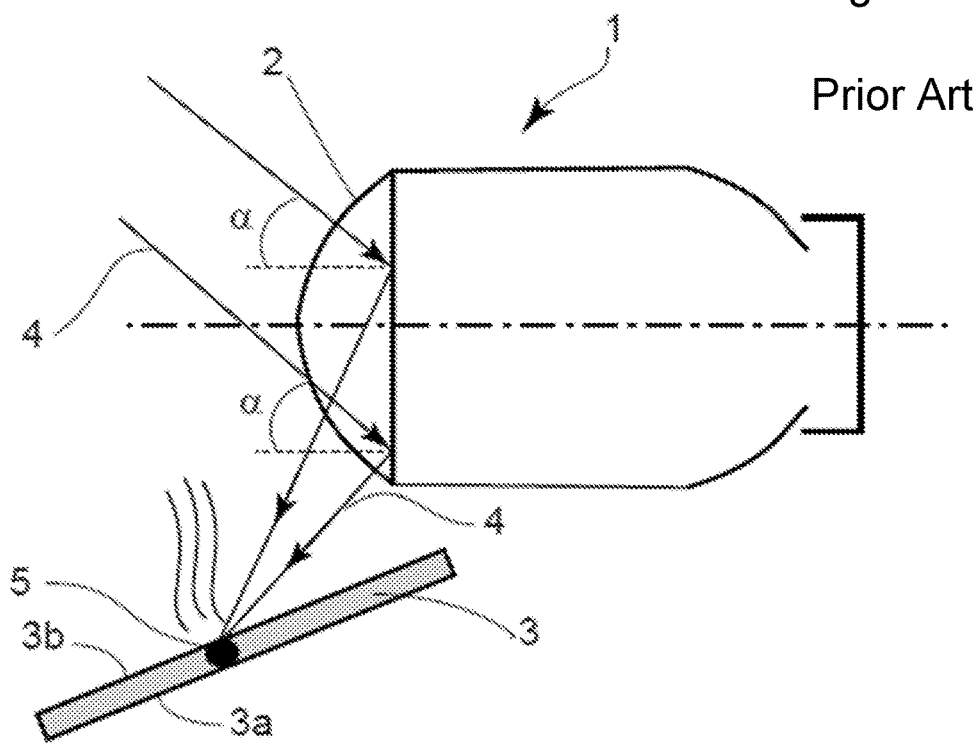
FIG. 1 is a diagrammatic side view of a lighting assembly for lighting and/or signaling in a vehicle, showing the "sunburn" technical problem that the prior art proposes to solve.

To simplify representation and reading, the invention will be considered in its application to a lighting assembly for lighting and/or signaling in which a lighting module 1 includes a single light-emitting source, the following description applying in the same manner whatever the number of light-emitting sources concerned. Likewise, in the following description the invention will be considered in its application to a lighting assembly for lighting and/or signaling situated at the front of a motor vehicle, in which position the probability of being exposed to the problem that the invention aims to address is strongest, but it will be clear that the invention may be applied in the same manner to any lighting and/or signaling lighting assembly of the vehicle, whatever its position on the latter.

As mentioned in the preamble of the present document, a lighting assembly for lighting and/or signaling in a motor vehicle comprises, non-exhaustively, a lighting module 1 that includes, in particular, a light-emitting source (not shown), means for optically deflecting the rays emitted by the light source (not shown) designed to provide a correct distribution of the luminous energy in the direction of a focusing means disposed at the outlet of the lighting module 1 to create a light beam. According to the preferred embodiment shown, the focusing means consist of a lens 2, but the invention applies whatever focusing means 2 are adopted.

The lighting and/or of signaling lighting assembly also includes a mask 3 that confers on the lighting and/or signaling assembly a part of its aesthetic as perceived by an observer from the outside of the vehicle, notably by concealing certain elements of the lighting module 1 from the outside (byway of nonlimiting example, components for fixing components of the lighting module 1). Of complex shape, most often produced by injection molding a plastic material in an appropriate mold, the mask 3 includes at least one portion that extends under the lens or focusing means 2, as shown in FIGS. 2 and 3 for example.

In some driving situations, shown by way of example in FIG. 1 and combining in particular a position of the vehicle facing the sun and on a particular slope and a position of the sun sufficiently high in the sky, solar rays 4 reach the lens or focusing means 2 at an angle α such that, reflected by the lens or focusing means 2, the solar rays 4 are focused by the latter and concentrated in an area 5 of small size of the portion of the mask 3 situated under the lens or focusing means 2. In this area 5 of concentration of the solar rays 4, the mask 3 then undergoes a large rise in temperature, which leads to accelerated ageing and, in some cases, to irreversible damage to the mask 3. This phenomenon is all the greater when at least this portion of the mask 3 has a very dark, or even black, visual appearance, because then the material does not reflect light and absorbs heat.

Figure 2:
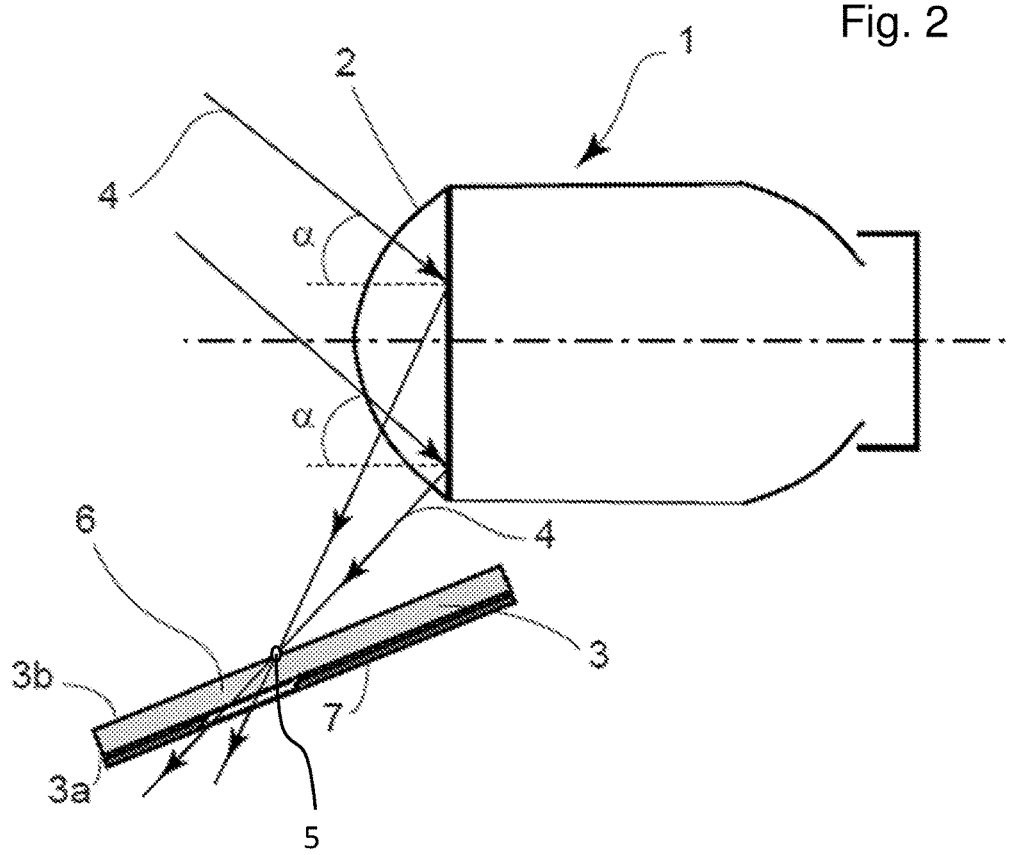
FIG. 2 is a side view of a lighting assembly for lighting and/or signaling according to a first embodiment of the invention.
Figure 3:
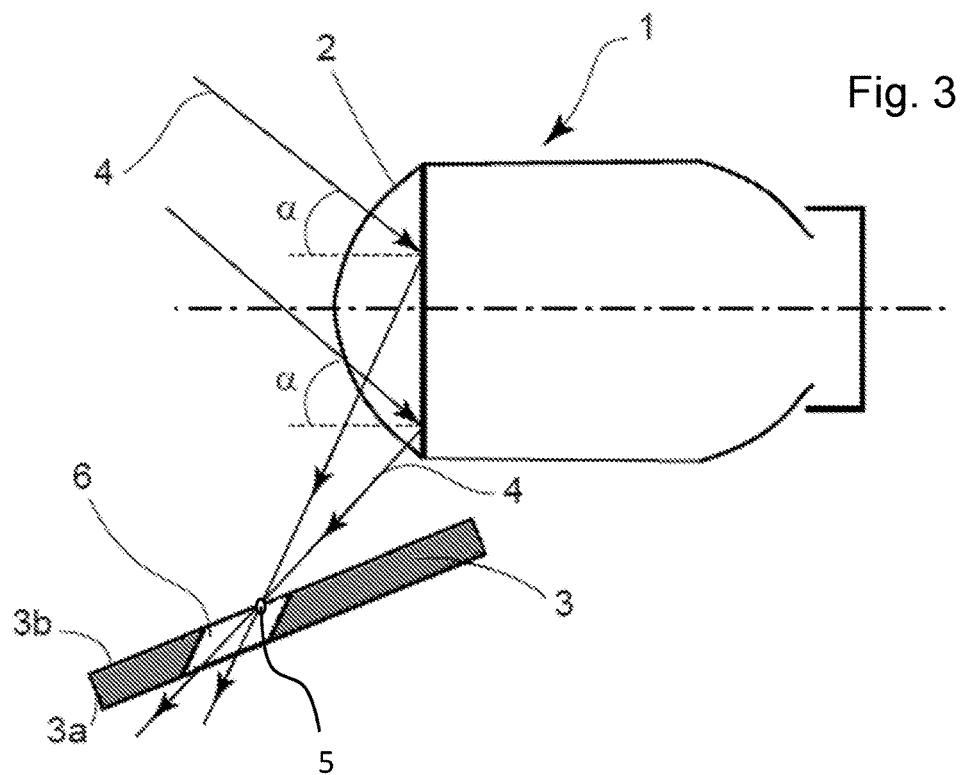
FIG. 3 is a side view of a lighting assembly for lighting and/or signaling according to a second embodiment of the invention.

As FIGS. 2 and 3 in particular show, the invention proposes to render transparent to the solar rays 4 focused by the lens 2 a part 6 of small size of the mask 3 including the area 5 of concentration of the solar rays 4. In order to optimize the embodiments of this transparent part 6, there is defined on this mask 3 a first or rear face 3a, opposite a second face 3b of the mask 3 that is exposed to the solar rays 4 focused by the lens or focusing means 2.

The transparent part 6 extends throughout the thickness of the mask 3, from the first face 3a to the second face 3b, so that the solar rays 4 reflected and focused by the lens or focusing means 2 pass through the mask 3 without creating any local heating, or generating only very slight heating.

The area 5 of concentration of the solar rays 4 on the mask 3 being of small size, the transparent part 6 is advantageously also of small size (typically of the order of 1 mm wide). It follows that the overall visual appearance of the mask 3 and the lighting assembly is unchanged for an observer facing the vehicle equipped with a lighting and/or signaling lighting assembly according to the invention.

Figure 4:
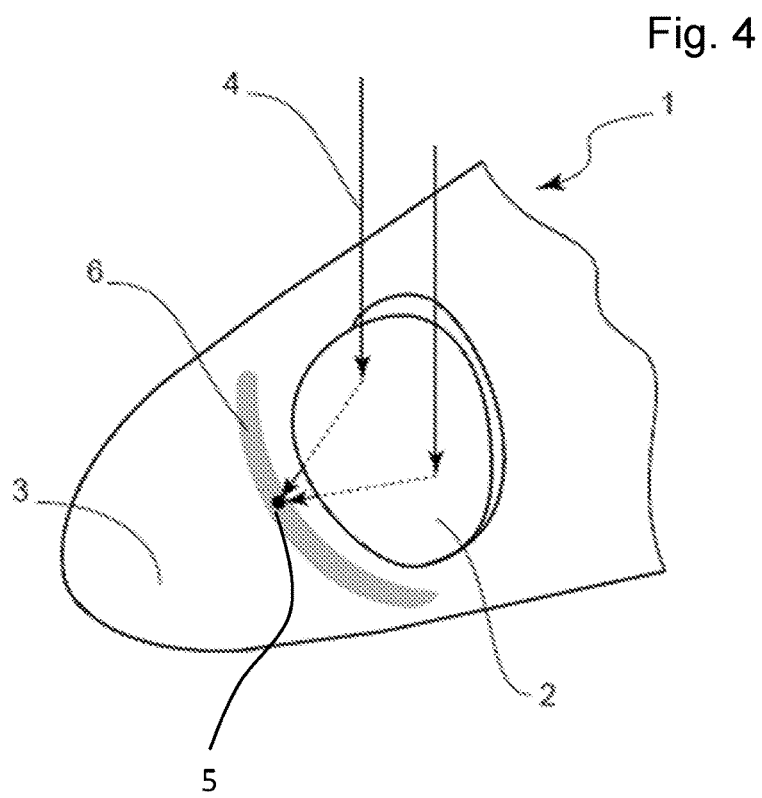
FIG. 4 shows a plan view of a lighting assembly according to the invention.

Note that, as shown in FIG. 4, which is a diagrammatic plan view of a lighting assembly according to the invention, with only the lens or focusing means 2 and a mask 3 portion visible, that although the part 6 rendered transparent to the solar rays 4 reflected and focused onto the mask 3 by the lens forming the focusing means 2 is of small width, its length is advantageously equal to or greater than the width of the focusing means 2. The part 6 transparent to the solar rays 4 has in the instance shown a circular arc shape espousing the domed shape of the lens here forming the focusing means 2. This circular arc shape corresponds to the movement of the substantially pointed area 5 of concentration of the solar rays 4 onto the mask 3 as a function of the inclination vehicle and the position of the sun in the sky.

It is clear that the part 6 transparent to the solar rays 4 is advantageously produced as shown in FIGS. 2 and 3, with an inclination relative to the normal to the plane of the mask 3, in the direction of the lens or focusing means 2. The transparent part 6 is therefore oriented substantially in the direction of the solar rays 4 at the area 5 of concentration of the solar rays 4 on the mask 3 so as to allow those solar rays 4 to pass more effectively, and it is therefore oriented toward the interior of the vehicle, further accentuating the impression for the observer that the mask 3 does not include any part transparent to the solar rays 4.

According to the invention, the mask 3 and the transparent part 6 may be made in different ways that will be described non-exhaustively hereinafter.

It is possible to produce a first variant of the mask 3 in a highly transparent base polymer material of the polycarbonate (PC) or polyethersulfone (PES) type, combining that material with the presence of an appropriate additive to render the mask 3 opaque throughout except for the area 5 corresponding to the part 6 made transparent to the solar rays 4.

This additive may consist in a thin coating 7 disposed on the first face 3 a of the mask 3 as shown in FIG. 2. By way of nonlimiting example, the coating 7 may consist of a layer of paint or a metal deposited as a thin film. The coating 7 may be deposited by an aluminizing process, for example.

The coating 7 is darker than the base material of the mask 3 and this coating 7 therefore contributes to the dark appearance that it is wished to impart to the mask 3. As specified above, to this end this coating 7 must not be present in the area corresponding to the part 6. The absence of coating 7 can be produced by masking the part 6 during the deposition of the coating 7 or by selective ablation of the coating 7 over the part 6 after its deposition. As shown in FIG. 2, the thin material layer coating 7 is absent from the part 6 of the mask 3 in which the solar rays 4 reflected and focused by the lens or focusing means 2 are concentrated. The "diffusing black" visual appearance of the mask 3 as a whole is therefore preserved, but the part 6 of the mask 3 becomes transparent to the solar rays 4, which pass through it without generating excessive heating. By way of example, reductions of more than 30 degrees Celsius of the heating of the mask 3 have been measured when using this embodiment of the invention.

According to an alternative embodiment of the invention, the transparent part 6 may be produced using a mask 3 produced by injection molding two different materials. The two different materials consist of a transparent first material that extends over a narrow part 6 (of the order of one millimeter wide) of the mask 3 including the area 5 of concentration of the solar rays 4 on the mask 3 and a second, entirely opaque material of lower cost, providing the aesthetic functions expected of the mask 3. An embodiment of this kind, slightly most costly than the embodiment previously described, nevertheless makes it possible to achieve, still at relatively low cost, even better thermal performance, whilst extending the range of aesthetic possibilities.

The foregoing description explains clearly how the invention makes it possible to achieve the objectives set for it and in particular to propose a lighting assembly that makes it possible to reduce greatly the damage resulting from reflection and focusing of solar rays 4 within the lighting assembly. Those objectives are notably achieved by the integration of a part 6 transparent to those solar rays 4 in a mask 3 the effect of which for external observers is opaque, with a dimension adapted to allow these solar rays 4 to pass without an outside observer being able to see that a transparent part 6 of this kind exists.

It is nevertheless to be noted that the invention should not be considered as limited to the embodiments described in the present document and that it extends to any equivalent means and to any technically operative combination of such means. In particular, if the lighting and/or signaling module of the vehicle includes a plurality of light-emitting sources and a plurality of lenses or focusing means 2 disposed in series to generate a plurality of light beams, without departing from the context of the invention the geometry of the part 6 to be rendered transparent to the solar rays 4 reflected and focused by all of the lenses or focusing means 2 of the lighting module 1 could advantageously be adapted, notably in terms of length, or there could be provision for providing serially within the thickness of the mask 3 a plurality of parts 6 each rendered transparent to solar rays 4.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting assembly for lighting and/or signaling in a motor vehicle, comprising:
    a lighting module accommodating at least a light emitter part and a light focusing part for focusing one or more light beams; and
    a mask, the mask including a portion of which extends under the light focusing part, wherein a transparent part of the mask is disposed on the mask in an area determined to be an area of contact of solar rays reflected and focused onto the portion of the mask extending under the light focusing part by the light focusing part so that the solar rays pass through the mask at the level of the transparent part, wherein
    the transparent part is inclined relative to a normal of a plane of the mask so as to be oriented in a direction of the focusing part.

2. The lighting assembly according to claim 1, wherein the portion of the mask extending under the light focusing part includes a first face opposite a second face exposed to the solar rays, the transparent part extending over all the height of the mask from the first face to the second face.

3. The lighting assembly according to claim 2, wherein the mask is produced with a transparent or translucent base material and wherein the base material is combined with an additive rendering the mask darker than in its original composition without the additive, except for the area of the transparent part.

4. The lighting assembly according to claim 2, wherein the mask is produced by injection molding two polymer materials with different thermal properties, one of the two polymer materials constituting the transparent part transparent to the solar rays reflected and focused onto the mask by the light focusing part and second of the two polymer materials constituting the rest of the mask.

5. The lighting assembly according to claim 2, wherein the transparent part has a circular arc shape following the curvature of a lens forming the light focusing part.

6. The lighting assembly according to claim 1, wherein the mask is produced with a transparent or translucent base material and wherein
    the base material is combined with an additive rendering the mask darker than in its original composition without the additive, except for the area of the transparent part.

7. The lighting assembly according to claim 6, wherein the additive consists of at least one thin coating disposed on the first face of the mask opposite the second face of the mask exposed to the solar rays, the transparent part being formed by the base material of the mask and an opening formed in the at least one thin coating.

8. The lighting assembly according to claim 7, wherein the at least one thin coating includes apertures produced by laser ablation to form the opening.

9. The lighting assembly according to claim 8, wherein the transparent part has a circular arc shape following the curvature of a lens forming the light focusing part.

10. The lighting assembly according to claim 7, wherein the transparent part has a circular arc shape following the curvature of a lens forming the light focusing part.

11. The lighting assembly according to claim 6, wherein the transparent part has a circular arc shape following the curvature of a lens forming the light focusing part.

12. The lighting assembly according to claim 1, wherein the mask is produced by injection molding two polymer materials with different thermal properties, one of the two polymer materials constituting the transparent part transparent to the solar rays reflected and focused onto the mask by the light focusing part, and the second of the two polymer materials constituting the rest of the mask.

13. The lighting assembly according to claim 12, wherein the transparent part has a circular arc shape following the curvature of a lens forming the light focusing part.

14. The lighting assembly according to claim 1, wherein the transparent part has a circular arc shape following the curvature of a lens forming the light focusing part.

15. The lighting assembly according to claim 1, wherein the transparent part has a circular arc shape following the curvature of a lens forming the light focusing part.

* * * * *